US007041231B2

(12) United States Patent
Holmes et al.

(10) Patent No.: US 7,041,231 B2
(45) Date of Patent: May 9, 2006

(54) METHOD OF REFURBISHING A TRANSITION DUCT FOR A GAS TURBINE SYSTEM

(75) Inventors: Henry V. Holmes, Prescott, AZ (US); Alan C. Banner, Gilbert, AZ (US); Brenton L. Blanche, Tempe, AZ (US); Paul H. Coleman, Mesa, AZ (US); Jeffery R. Schenk, Phoenix, AZ (US); Richard J. Stueber, Paradise Valley, AZ (US)

(73) Assignee: Triumph Brands, Inc., Wayne, PA (US)

( * ) Notice: Subject to any disclaimer, the term of this patent is extended or adjusted under 35 U.S.C. 154(b) by 264 days.

(21) Appl. No.: 10/337,679

(22) Filed: Jan. 6, 2003

(65) Prior Publication Data

US 2005/0211674 A1 Sep. 29, 2005

(51) Int. Cl.
*B44C 1/22* (2006.01)
*C03C 15/00* (2006.01)
*C03C 25/68* (2006.01)
*C23F 1/00* (2006.01)
*C23F 3/00* (2006.01)

(52) U.S. Cl. .......................................... 216/108; 134/3

(58) Field of Classification Search .................. 216/95, 216/96, 100, 101, 102, 103, 108; 134/3
See application file for complete search history.

(56) References Cited

U.S. PATENT DOCUMENTS 2,299,254 A 10/1942 Riney et al.
2,315,133 A 3/1943 Riney et al.
2,676,353 A 4/1954 Maynard
2,783,167 A 2/1957 Lineberry et al.
3,326,224 A 6/1967 Gartner
3,622,391 A * 11/1971 Baldi ............................ 134/3
3,626,032 A 12/1971 Norris
4,044,418 A 8/1977 Ishii et al.
4,137,131 A 1/1979 Donaghy
4,405,660 A * 9/1983 Ulion et al. ............. 427/248.1
4,425,185 A * 1/1984 Fishter et al. ............... 216/103
4,700,475 A 10/1987 Jost et al.
4,762,168 A 8/1988 Kawabe et al.
4,804,362 A 2/1989 Enzo
5,207,248 A 5/1993 Seki et al.
5,294,262 A 3/1994 Nishimura
5,358,603 A 10/1994 Ibrahim et al.
5,380,370 A 1/1995 Niino et al.
5,512,104 A 4/1996 Mizushiri et al.
5,580,393 A 12/1996 Lawther
5,607,575 A 3/1997 Kamiya et al.

(Continued)

*Primary Examiner*—Parviz Hassanzadeh
*Assistant Examiner*—Roberts Culbert
(74) *Attorney, Agent, or Firm*—Bryan Cave LLP

(57) ABSTRACT

A method of refurbishing a transition duct (100) for a gas turbine system includes providing the transition duct. The transition duct has a first wall (221) defining a first passageway (110) and having holes (223) through a metal layer (322) and a ceramic layer (323), and the transition duct also has a second wall (222) adjacent to and separate from the first wall and external to the first passageway, where the first and second walls define a second passageway (210) coupled to the first passageway through the holes in the first wall. The method further includes masking the holes in the first wall, sealing the first passageway, and after sealing the first passageway, using a liquid etchant to chemically remove the ceramic layer from the first wall while keeping the liquid etchant out of the second passageways.

32 Claims, 5 Drawing Sheets

U.S. PATENT DOCUMENTS

| | | | | | |
|---|---|---|---|---|---|
| 5,609,721 | A | | 3/1997 | Tsukune et al. | |
| 5,614,054 | A | * | 3/1997 | Reeves et al. | 156/344 |
| 5,637,153 | A | | 6/1997 | Niino et al. | |
| 5,643,474 | A | * | 7/1997 | Sangeeta | 216/96 |
| 5,685,041 | A | | 11/1997 | Sivacoe | |
| 5,685,917 | A | * | 11/1997 | Sangeeta | 134/2 |
| 5,773,400 | A | | 6/1998 | Baillely et al. | |
| 5,813,118 | A | * | 9/1998 | Roedl et al. | 29/889.1 |
| 5,846,247 | A | | 12/1998 | Unsworth et al. | |
| 5,851,409 | A | * | 12/1998 | Schaeffer et al. | 216/2 |
| 5,900,102 | A | * | 5/1999 | Reeves | 156/344 |
| 5,902,406 | A | | 5/1999 | Uchiyama et al. | |
| 5,944,909 | A | * | 8/1999 | Reeves et al. | 134/3 |
| 5,972,424 | A | * | 10/1999 | Draghi et al. | 427/142 |
| 5,976,265 | A | * | 11/1999 | Sangeeta et al. | 134/3 |
| 6,485,655 | B1 | * | 11/2002 | Das et al. | 216/45 |
| 6,575,817 | B1 | * | 6/2003 | Czech | 451/61 |

* cited by examiner

400

400

400

METHOD OF REFURBISHING A TRANSITION DUCT FOR A GAS TURBINE SYSTEM

FIELD OF THE INVENTION

This invention relates to gas turbines, in general, and to methods of refurbishing transition ducts for gas turbine systems, in particular.

BACKGROUND OF THE INVENTION

Over the last decade, the increased worldwide demand for electrical power has increased the number of land-based gas turbine systems. One of the expensive components in a gas turbine system is a transition duct in which the actual hot gas is ducted from the exit of the combustion chamber to the inlet of the turbine. The transition duct includes a ceramic layer and a metallic bonding layer for thermal and corrosion protection. The flow of hot gas degrades a ceramic coating or layer on the inner wall of the transition duct, and consequently, after using the transition duct up to its operating limit, the transition duct must be periodically refurbished to replace the degraded ceramic layer.

Prior to replacing the ceramic layer, however, the ceramic layer must be completely removed in order to ensure that the new ceramic layer is reliably adhered onto the inner wall of the transition duct. This removal process typically includes a grit blasting technique or a water jet cleaning technique that physically or mechanically removes the ceramic layer from the inner walls and may, in some instances, include a combination of mechanical and chemical methods. The metallic bonding layer is subsequently removed either by a physical or mechanical process using one or more of the aforementioned techniques or by a chemical process using intimate chemical exposure.

In addition to the expensive and labor intensive nature of the grit blasting process, the extreme imprecision of the grit blasting technique causes numerous problems during the refurbishing process. For example, the grit blasting technique not only removes the metallic bonding layer and the ceramic layer, but also often reduces the thickness of the base material for the walls of the transition duct. The thinned walls create a reliability problem for the transition duct, which renders the transition duct unusable. Consequently, the transition duct must be replaced, instead of being refurbished or repaired, which increases the maintenance cost for the gas turbine system.

Accordingly, a need exists for a new method of refurbishing a transition duct for a gas turbine system, where the method is less labor intensive, less costly, and more precise when compared to the aforementioned process.

BRIEF DESCRIPTION OF THE DRAWINGS

The invention will be better understood from a reading of the following detailed description, taken in conjunction with the accompanying figures in the drawings in which.

Figure 1:
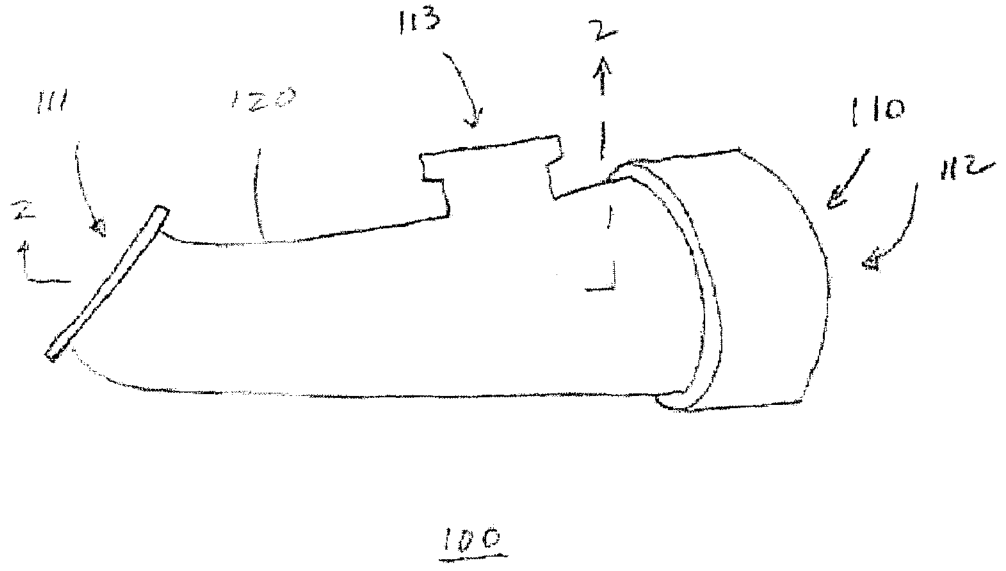
FIG. 1 illustrates a side view of a transition duct in accordance with an embodiment of the invention.

For simplicity and clarity of illustration, the drawing figures illustrate the general manner of construction, and descriptions and details of well-known features and techniques are omitted to avoid unnecessarily obscuring the invention. Additionally, elements in the drawing figures are not necessarily drawn to scale. For example, the dimensions of some of the elements in the figures may be exaggerated relative to other elements to help to improve understanding of embodiments of the present invention. Furthermore, the same reference numerals in different figures denote the same elements.

Additionally, the terms first, second, third, fourth, and the like in the description and in the claims, if any, are used for distinguishing between similar elements and not necessarily for describing a sequential or chronological order. It is further understood that the terms so used are interchangeable under appropriate circumstances such that the embodiments of the invention described herein are, for example, capable of operation in other sequences than illustrated or otherwise described herein.

Furthermore, the terms left, right, front, back, top, bottom, over, under, and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than illustrated or otherwise described herein.

Additionally, the terms "comprise," "include," "have," and any variations thereof, are intended to cover a non-exclusive inclusion, such that a process, method, article, or apparatus that comprises a list of elements does not include only those elements, but may include other elements not expressly listed or inherent to such process, method, article, or apparatus.

DETAILED DESCRIPTION OF THE DRAWINGS

FIG. 1 illustrates a side view of a transition duct 100. In one embodiment, transition duct 100 can be used in a gas turbine system for generating electrical power. A wall 120 of transition duct 100 can delineate or define a passageway 110 through transition duct 100. Natural gas is burned or combusted within passageway 110 of transition duct 100 to generate heat, and the heat is used to indirectly generate electricity.

Wall 120 can also define openings 111, 112, and 113 for passageway 110. Passageway 1 10 has a length greater than its width and has an input at one end of the length and an output at an opposite or other end of the length. As an example, opening 112 can be an input for passageway 110, and opening 111 can be an output for passageway 110.

Figure 2:
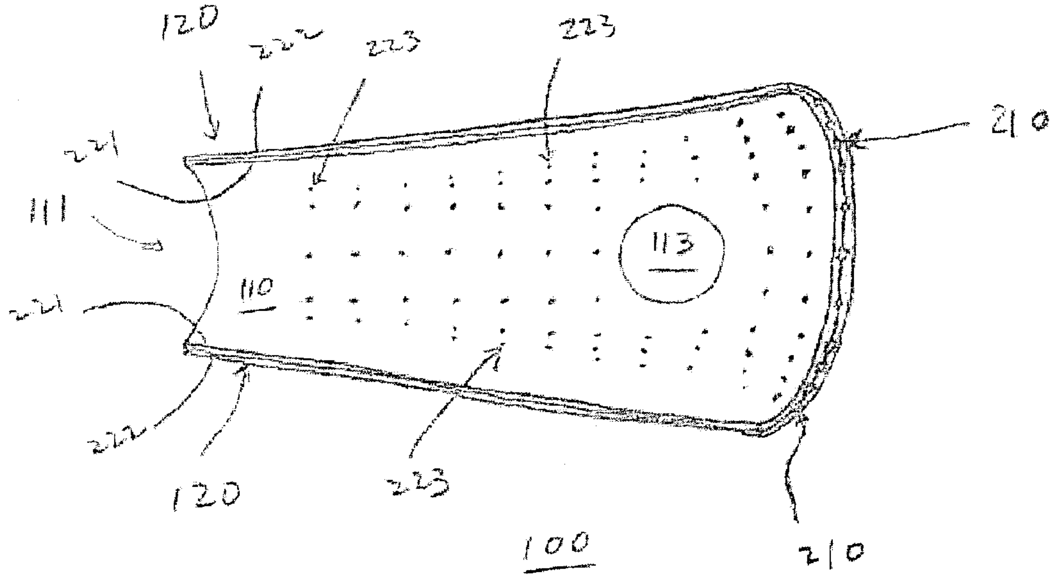
FIG. 2 illustrates a cross-sectional view of a portion of the transition duct of FIG. 1 taken along a section line 2—2 in FIG. 1 in accordance with an embodiment of the invention.

FIG. 2 illustrates a cross-sectional view of a portion of transition duct 100 taken along a section line 2—2 in FIG. 1. As illustrated in FIG. 2, wall 120 can be comprised of two walls 221 and 222. Wall 221 of wall 120 defines passageway 110 and has holes 223 extending through wall 221. As explained in more detail hereinafter with reference to FIG. 3, wall 221 can be comprised of a metal layer, a metallic bonding layer, and a ceramic layer.

Wall 222 of wall 120 is located adjacent to, but is separate from, wall 221 of wall 120. Wall 222 is external to or is otherwise located outside of passageway 110. As explained in more detail hereinafter, wall 222 can be comprised of the same metal layer as is located in wall 221.

Walls 222 and 221 combine to define passageways 210 within wall 120. Passageways 210 are coupled to holes 223 in wall 221. Passageways 210 can, but do not have to, extend the entire length of passageway 110 and/or transition duct 100. During normal operation of transition duct 100 within a gas turbine system, passageways 210 carry a coolant.

In a first embodiment, wall 222 forms a portion of the external appearance of transition duct 100 while wall 221 does not. In this first embodiment, passageways 210 can extend the entire length of passageway 110 and/or transition duct 100. In a second embodiment, walls 222 and 221 form different portions of the external appearance of transition duct 100. In this second embodiment, passageways 210 do not extend the entire length of passageway 110 or transition duct 100.

Figure 3:
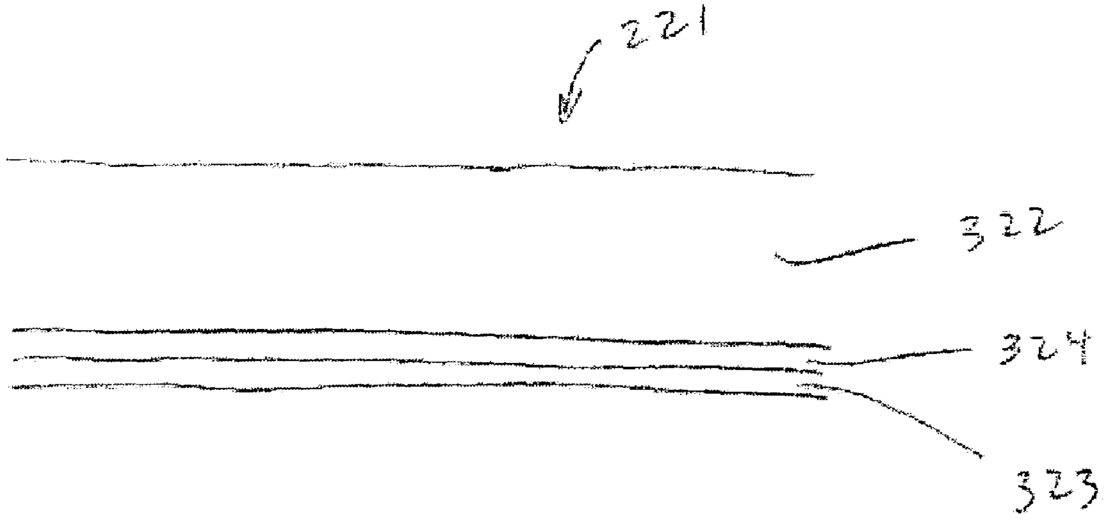
FIG. 3 illustrates a detailed cross-sectional view of a wall of the transition duct of FIG. 1 in accordance with an embodiment of the invention.

FIG. 3 illustrates a detailed cross-sectional view of wall 221 in transition duct 100. Wall 221 comprises a metal layer 322, a ceramic layer 323, and a metallic bonding layer 324 located between metal layer 322 and ceramic layer 323. Ceramic layer 323 is located between passageway 110 (FIGS. 1 and 2) and metallic bonding layer 324.

In one embodiment, ceramic layer 323 and metallic bonding layer 324 are located only at one side or surface (i.e., the inside surface) of metal layer 322 and wall 221. In this embodiment, wall 222 (FIG. 2) can be coupled to metal layer 322. In a different embodiment, ceramic layer 323 and metallic bonding layer 324 can be located at both sides of metal layer 322 and wall 221. In the same or a different embodiment, metallic bonding layer 324 and ceramic layer 323 are not located over all of the inside surface of metal layer 322 or wall 221. In this embodiment, a portion of ceramic layer 323 and a portion of metal layer 322 can define passageway 110 (FIGS. 1 and 2).

As an example, metal layer 322 in wall 221 can be a base material for wall 221 and can comprise a 617-nickel-based superalloy. Additionally, the super-alloy can be strengthened by complex compositions. An example of a suitable super-alloy is manufactured by Inco Alloys International, Inc. in Huntington, West Va. under the brand name Inconel®. An example of another suitable super-alloy is manufactured by Haynes International, Inc. in Kokomo, Ind. under the brand name Haynes®. The same super-alloy used for metal layer 322 in wall 221 can also be used at least as a base material for wall 222 (FIG. 2). In one embodiment, metal layer 322 can have a thickness of approximately 0.250 inches.

Ceramic layer 323 in wall 221 provides corrosion resistance during use of transition duct 100 (FIG. 1). Ceramic layer 323 also serves as a thermal barrier coating and distributes the heat within passageway 110 (FIG. 1) across wall 221 to cool portions of wall 221 by reducing thermal gradients across the length of transition duct 100 (FIG. 1). This thermal gradient reduction improves the efficiency of the gas turbine system in which transition duct 100 (FIG. 1) is used.

In one embodiment, ceramic layer 323 is comprised of a yttria stabilized zirconia material or ceramic. As an example, the ceramic can comprise approximately six to twelve percent yttria by weight. In this embodiment, ceramic layer 323 can have a thickness of approximately one to five centimeters.

Metallic bonding layer 324 in wall 221 adheres ceramic layer 323 to metal layer 322. Metallic bonding layer 324 also inhibits the oxidation of metal layer 322. In one embodiment, metallic bonding layer 324 is comprised of M, chromium, aluminum, and yttrium (MCrAlY), where M is nickel, cobalt, or nickel and cobalt, and can be formed over metal layer 322 using a atmospheric plasma spray (APS), high-velocity oxygen fuel (HVOF), low pressure plasma spray (LPPS), or electron beam physical vapor deposition (EBPVD) process. In another embodiment, metallic bonding layer 324 is comprised of an aluminide or platinum-aluminide diffusion coating. Metallic bonding layer 324 can have a thickness of approximately ten to twenty-five millimeters.

Figure 4:
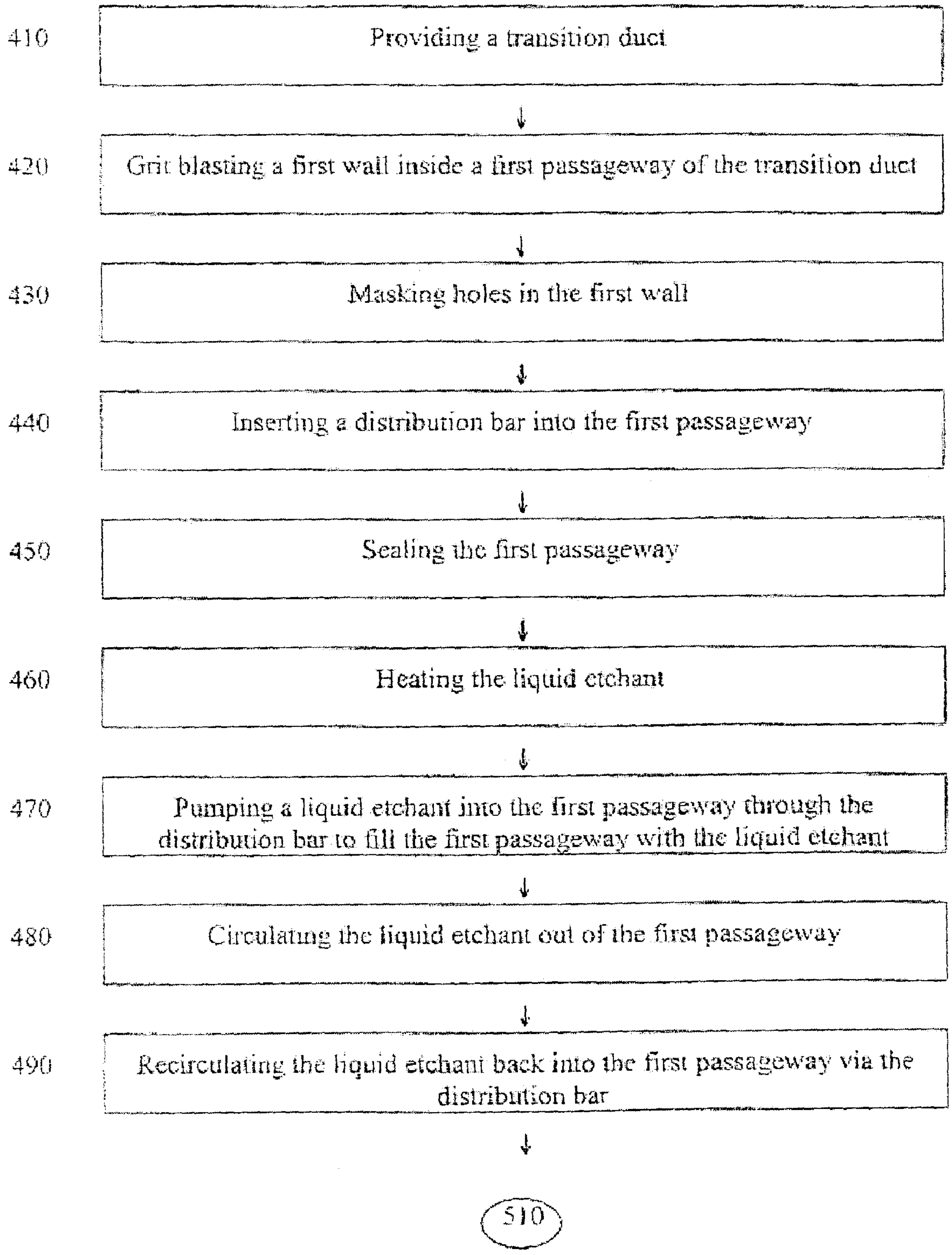
FIGS. 4, 5, and 6 illustrate a flow chart for a method of refurbishing a transition duct in accordance with an embodiment of the invention.
Figure 5:
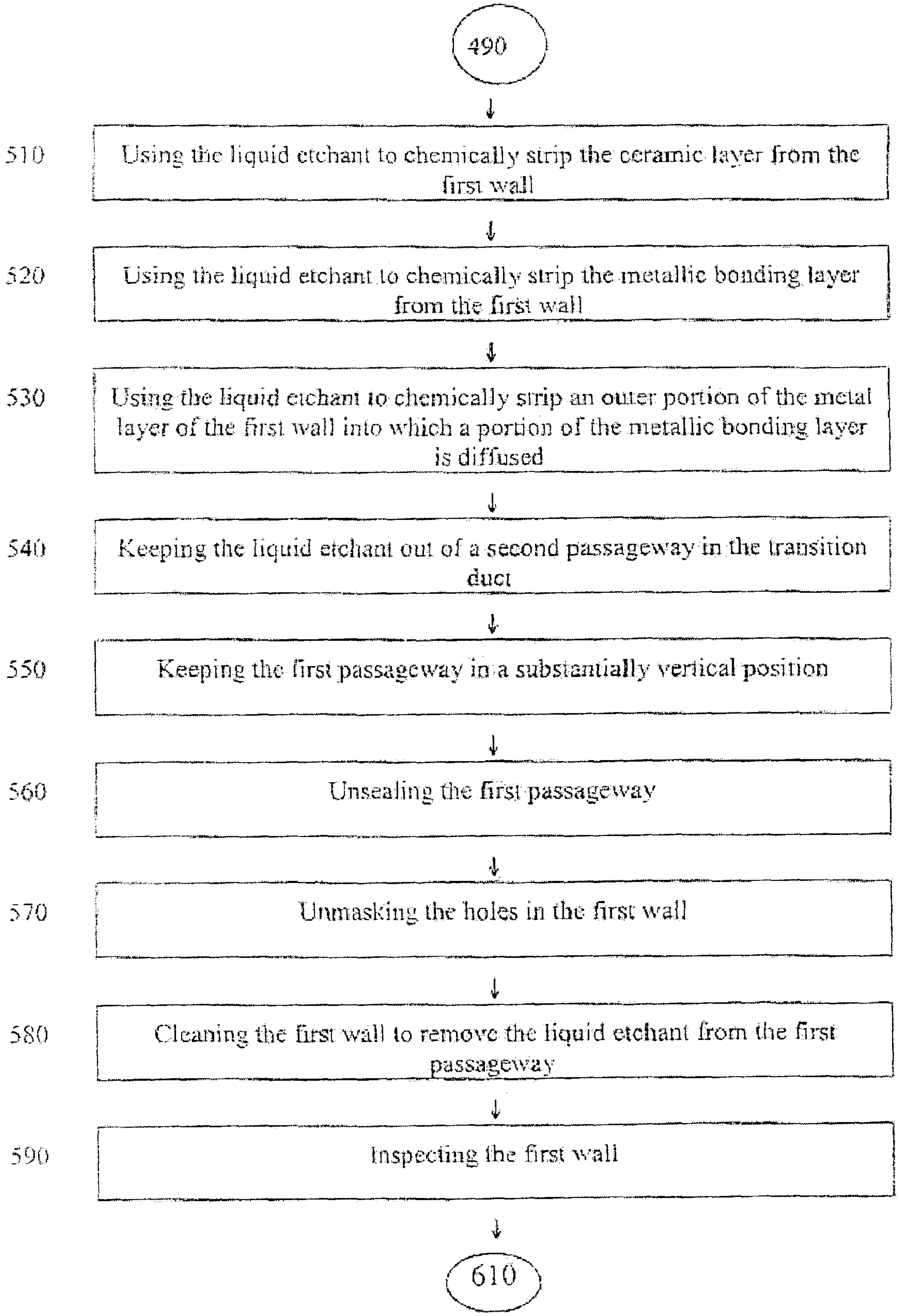
Figure 6:
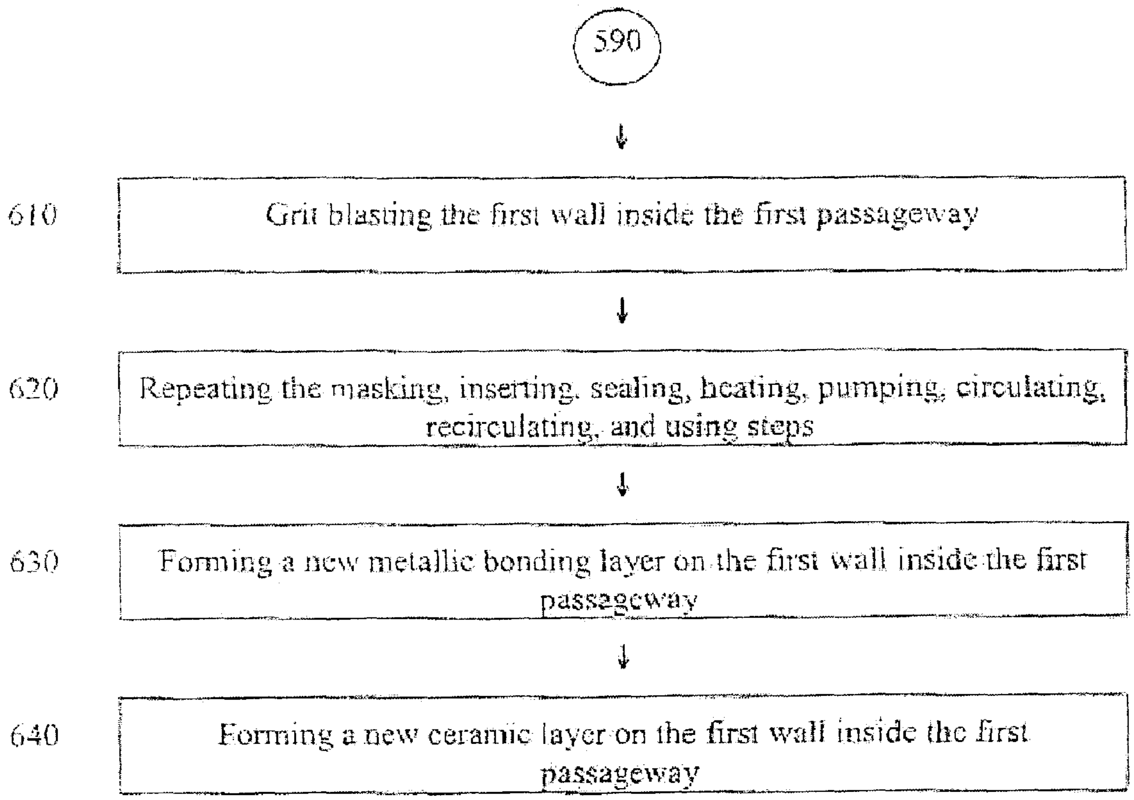

During use of transition duct 100 (FIGS. 1 and 2), ceramic layer 323 is often eroded, worn away, or otherwise degraded by the extremely high temperatures in passageway 110 (FIGS. 1 and 2). Consequently, transition duct 100 (FIGS. 1 and 2) needs to be refurbished or replaced. The cost of replacing transition duct 100 (FIGS. 1 and 2) is higher than the cost of refurbishing transition duct 100 (FIGS. 1 and 2). The method of refurbishing transition duct 100 (FIGS. 1 and 2), however, needs to be precise to avoid damaging transition duct 100 (FIGS. 1 and 2). In particular, ceramic layer 323 must be carefully removed and subsequently re-applied to wall 221 of transition duct 100 (FIGS. 1 and 2) without thinning or otherwise damaging metal layer 322. The following figures, FIGS. 4, 5, and 6, illustrate a method of refurbishing a transition duct that meets these requirements and that is less labor intensive than the prior art method. In general, the refurbishing method uses the transition duct as its own etch chamber and can chemically remove or strip off ceramic layer 323 and metallic bonding layer 324 using a single chemical solution during a single removal or stripping cycle without deleteriously affecting metal layer 322.

More specifically, turning to FIG. 4, a flow chart 400 for such a method includes a step 410 to provide a transition duct. As an example, the transition duct can be similar to transition duct 100 in FIGS. 1 and 2.

Next, flow chart 400 in FIG. 4 includes an optional step 420 to grit blast a first wall inside a first passageway of the transition duct. As an example, the first wall can be similar to wall 221 in FIGS. 2 and 3. Furthermore, the first passageway can be similar to passageway 110 in FIGS. 1 and 2.

Moving to the next step in flow chart 400, a step 430 is used to mask holes located in the first wall. As an example, the holes can be similar to holes 223 in FIG. 2. This masking step forms at least one removable mask over the holes. In one embodiment, the masking step can form a separate mask for each of the holes. In a different embodiment, the masking step can form a single mask for all of the holes. The mask or masks prevent a subsequently-used liquid etchant from entering into the holes. The mask or masks also prevent the holes from being clogged by residue or other particulates in the liquid etchant. Accordingly, the mask covers, fills, and/or plugs the holes.

As an example, the masking process can use a peelable masking material, a lacquer-based masking material, a wax-based masking material, and/or a rubber-based masking material. The masking materials can be painted on with a brush and/or can be sprayed on by an ejector. The masking materials can be thermally cured in an oven for an hour or so.

Next, a step 440 of flow chart 400 can insert a distribution bar into the first passageway. As an example, the distribution bar can be a feeding tube, supply tube, or an elongated pipe with holes radially dispersed along its length. In one embodiment, the distribution bar can extend substantially along the entire length of the first passageway from the input to the output of the first passageway. In another embodiment, the distribution bar can extend substantially along a major portion of the entire length of the first passageway.

Then, a step 450 of flow chart 400 can seal the first passageway. In one embodiment, step 450 hermetically seals the first passageway. As an example, a gasket or O-ring can be used with a clamp or other attachment mechanism to provide the seal. As a different example, a cap or a plug can be used. The portion of the sealing device in contact with the first passageway should be resistant to the subsequently-used liquid etchant. Each of the openings in the first passageway should be sealed. As an example, openings 111, 112, and 113 of passageway 110 in FIGS. 1 and 2 should be sealed.

Subsequently, a step 460 of flow chart 400 in FIG. 4 heats a liquid etchant. As an example, step 460 heats the liquid etchant to a temperature of approximately one hundred twenty to one hundred seventy degrees Fahrenheit. In one embodiment, step 460 heats the liquid etchant to a temperature of approximately one hundred thirty-five plus or minus five degrees Fahrenheit. In some instances, the higher temperatures may not be used to avoid unnecessarily etching the base material of the first wall.

Moving to step 470 in flow chart 400, the liquid etchant is pumped into the first passageway. As an example, the liquid etchant can be pumped through the input of the first passageway and through the distribution bar. The liquid etchant can be injected or sprayed into the first passageway. In one embodiment, the liquid etchant completely fills the first passageway.

The liquid etchant is subsequently used to remove the ceramic layer in the first wall. Assuming that the ceramic layer is similar in composition to ceramic layer 323 in FIG. 3, the liquid etchant in step 470 of FIG. 4 can be comprised of hydrochloric acid or a hydrochloric-based solution. As an example, the hydrochloric acid can have a concentration of approximately eighteen to thirty-six percent by weight. In one embodiment, the hydrochloric acid has a concentration of approximately twenty-four plus or minus two percent by weight. Additionally, the liquid etchant can further comprise an inhibitor to inhibit or reduce the etching of the base material of the first wall and/or a metallic bond coat layer of the first wall. As an example, the inhibitor can be a commercially available hydrochloric acid inhibitor such as Aldac 365L and can have a concentration of less than approximately one percent by volume.

Next, a step 480 in flow chart 400 of FIG. 4 circulates the liquid etchant out of the first passageway. In one embodiment, the liquid etchant can be pumped or extracted out of the first passageway from the output of the first passageway.

Then, a step 490 in flow chart 400 recirculates the liquid etchant back into the first passage way via the distribution bar. As an example, the liquid etchant can be pumped back into the first passageway through the input of the first passageway. The recirculation process provides agitation for the liquid etchant in the first passageway to improve the uniformity of the etching process.

In one embodiment, the first passageway remains filled with the liquid etchant as the liquid etchant is circulated out of and recirculated into the first passageway. As an example, the recirculation step can continue for approximately twenty hours at a pressure of approximately five to fifty pounds per square inch and at a rate of approximately five to twenty-five gallons per minute. Other pressures and rates can be used as long as such rates and pressures are sufficient to flow the liquid etchant through the first passageway of the transition duct. The specific duration of step 490 depends on several factors including: (1) the method used to apply the ceramic layer to the metallic bonding layer, (2) the thickness of the ceramic layer, (3) the type of metallic bonding layer, (4) the method used to apply the metallic bonding layer to the metal layer, (5) the thickness of the metallic bonding layer, (6) the shape and size of the transition duct, (7) the service history of the transition duct, (8) the temperature of the liquid etchant, and (9) the composition of the liquid etchant.

Turning now to FIG. 5, a step 510 in flow chart 400 uses the liquid etchant to chemically strip the ceramic layer from the first wall. In the preferred embodiment, the liquid etchant chemically strips all of the ceramic layer from the first wall. Step 510 can be performed in preparation for forming a new ceramic layer for the first wall.

Subsequently, an optional step 520 in flow chart 400 can use the liquid etchant to chemically strip the metallic bonding layer from the first wall. Step 520 can be performed in preparation for forming a new metallic bonding layer and a new ceramic layer for the first wall. If step 520 is used in flow chart 400, the temperature of the liquid etchant can be increased, if needed, above the temperature of the liquid etchant in step 510 to permit the liquid etchant to react with the metallic bonding layer, or the temperature of the liquid etchant can remain the same during steps 510 and 520. In a different embodiment, step 520 uses a different liquid etchant to chemically strip the metallic bonding layer from the first wall.

Continuing with an optional step 530 in flow chart 400 of FIG. 5, the liquid etchant can be used to chemically strip a very thin outer portion of the metal layer of the first wall from the first wall. In some instances, a portion of the metallic bonding layer may be diffused into the outer portion of the metal layer. In these instances, step 530 can be performed to remove the outer portion of the metal layer in preparation for forming the new metallic bonding layer and the new ceramic layer for the first wall. If step 530 is used in flow chart 400, the temperature of the liquid etchant can be increased above the temperature of the liquid etchant in steps 510 and 520. In a different embodiment, step 530 uses a different liquid etchant to chemically strip the outer portion of the metal layer of the first wall from the first wall. Regardless of whether step 530 is used in flow chart 400, the liquid etchant should not deleteriously affect the metal layer. As an example, the liquid etchant should not significantly reduce the thickness of or significantly affect the structural integrity of the metal layer.

Each of steps 510, 520, and 530 can occur simultaneously with steps 470, 480, and 490 in FIG. 4. Each of steps 510, 520, and 530 are chemical removing processes, not physical removing processes. If the aggregate times for steps 510, 520, and 530 exceed approximately forty hours, then one or more of steps 510, 520, and/or 530 may need to be interrupted to repeat the masking process in step 430 of FIG. 4.

Continuing with a step 540 in flow chart 400 of FIG. 5, the liquid etchant is kept out of a second passageway in the transition duct and keeps the liquid etchant from contacting and etching certain portions of the transition duct. As an example, the second passageway can be similar to passageways 210 in FIG. 2. The at least one mask formed during step 430 in FIG. 4 keeps the liquid etchant out of the second passageway. In one embodiment, step 540 can occur simultaneously with each of steps 470, 480, 490 in FIG. 4 and steps 510, 520, and 530 in FIG. 5.

A step 550 in flow chart 400 of FIG. 5 keeps the first passageway in a substantially vertical position. As an example of this vertical configuration, the input of the first passageway can be positioned higher than the output of the first passageway. In one embodiment, step 550 can occur simultaneously with one or more of steps 470, 480, and 490 in FIG. 4 and steps 510, 520, and 530 in FIG. 5.

Next, a step 560 in flow chart 400 in FIG. 5 unseals the first passageway, and a step 570 in flow chart 400 unmasks the holes in the first wall.

Turning now to a step 580 in flow chart 400, the first wall is cleaned to remove the liquid etchant from the first passageway. As an example, the cleaning process can be used to neutralize the liquid etchant. In one embodiment, the cleaning process can use a tap water rinse, followed by a sodium hydroxide rinse having a pH value of approximately twelve to thirteen, and then another tap water rinse.

After step 580, a step 590 in flow chart 400 inspects the first wall. If a portion of the ceramic layer is found on the first wall while inspecting the first wall, then an optional step 610 in flow chart 400 in FIG. 6 can grit blast the first wall inside the first passageway. As an example, the grit blasting process can be used to physically remove an oxide layer from the ceramic layer to permit the liquid etchant to remove the ceramic layer. This grit blasting step is not used to remove the ceramic layer from the first wall. Similar to the grit blasting process in step 420 in FIG. 4, the grit blasting process in step 610 is a short one. Then, a step 620 in flow chart 400 in FIG. 6 can repeat steps 430, 440, 450, 460, 470, 480, 490 in FIG. 4 and steps 510, 520, and 530 in FIG. 5. Step 620 in FIG. 6 can also repeat steps 540, 550, 560, 570, 580, and 590 in FIG. 5.

Continuing with flow chart 400 in FIG. 6, a step 630 intentionally forms a new metallic bonding layer on the first wall inside the first passageway. Afterwards, a step 640 intentionally forms a new ceramic layer on the first wall, on the new metallic bonding layer, and inside the first passageway. After step 640, the transition duct can be re-assembled into and used in a gas turbine system.

Therefore, an improved method of refurbishing a transition duct for a gas turbine system is provided to overcome the disadvantages of the prior art. The method is more cost effective because it is less labor intensive compared to the prior art grit blasting process. Additionally, the likelihood of damaging the transition duct is lower during the refurbishing process using the liquid etchant compared to the lengthy grit blasting process in the prior art. Furthermore, the removal of the ceramic layer can be more precise when using the liquid etchant compared to the grit blasting process by choosing the proper etch chemistry, temperature, and pressure to provide a suitable etch selectivity between the ceramic layer and the underlying base material.

Although the invention has been described with reference to specific embodiments, it will be understood by those skilled in the art that various changes may be made without departing from the spirit or scope of the invention. For instance, the numerous details set forth herein such as, for example, the chemical concentrations and material compositions are provided to facilitate the understanding of the invention and are not provided to limit the scope of the invention. As another example, portions of the method described herein can be applied to other components besides transition ducts where such components can include, for example, turbine blades. As a further example, a gaseous or plasma etchant can be used, instead of a liquid etchant, to remove the ceramic layer and the metallic bonding layer from the base or metal layer. Accordingly, the disclosure of embodiments of the invention is intended to be illustrative of the scope of the invention and is not intended to be limiting. It is intended that the scope of the invention shall be limited only to the extent required by the appended claims.

Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims and (2) are or are potentially equivalents of express elements and/or limitations in the claims under the doctrine of equivalents.

What is claimed is:

1. A method of refurbishing a duct, the method comprising:

providing the duct comprising:

a first wall defining a first passageway, having holes therein, and comprising a metal layer and a ceramic layer; and a second wall adjacent to and separate from the first wall and external to the first passageway, the first and second walls defining a second passageway coupled to the first passageway through the holes in the first wall;

masking the holes in the first wall;

sealing the first passageway; and after sealing the first passageway, using a liquid etchant to chemically remove the ceramic layer from the first wall.

2. The method of claim 1 wherein:

the metal layer is comprised of a 617-nickel-based superalloy; and the ceramic layer is comprised of a yttria stabilized zirconia ceramic.

3. The method of claim 2 wherein:

the liquid etchant is comprised of hydrochloric acid and an inhibitor.

4. The method of claim 1 further comprising:

keeping the liquid etchant out of the second passageway.

5. The method of claim 1 wherein:

masking the holes further comprises:

forming at least one mask over the holes; and the method further comprises:

using the at least one mask to keep the liquid etchant out of the second passageway.

6. The method of claim 1 further comprising:

keeping the first passageway in a substantially vertical position while using the liquid etchant to chemically remove the ceramic layer from the first wall.

7. The method of claim 1 further comprising:

heating the liquid etchant to a temperature of approximately one hundred thirty to one hundred forty degrees Fahrenheit.

8. The method of claim 1 wherein:

recirculating the liquid etchant further comprises:

recirculating the liquid etchant at a pressure of approximately five to fifty pounds per square inch.

9. The method of claim 1 wherein:

recirculating the liquid etchant further comprises:

recirculating the liquid etchant at a rate of approximately five to twenty-five gallons per minute.

10. The method of claim 1 further comprising:

grit blasting the first wall inside the first passageway.

11. The method of claim 1 further comprising:

cleaning the first wall;

inspecting the first wall; and if a portion of the ceramic layer is found while inspecting the first wall:

grit blasting the first wall inside the first passageway; and repeating the sealing and using steps.

12. A method of refurbishing a transition duct for a gas turbine system, the method comprising:

providing the transition duct comprising:

a first wall defining a first passageway, having holes therein, and comprising a metal layer, a ceramic layer, and a metallic bonding layer located between the metal layer and the ceramic layer; and a second wall adjacent to and separate from the first wall and external to the first passageway, the first and second walls defining a second passageway coupled to the first passageway through the holes in the first wall;

masking the holes in the first wall;

sealing the first passageway;

filling the first passageway with a liquid etchant;

recirculating the liquid etchant in the first passageway;

using the liquid etchant to chemically remove the ceramic layer from the first wall;

cleaning the first wall to remove the liquid etchant from the first passageway;

inspecting the first wall; and if a portion of the ceramic layer is found while inspecting the first wall:

grit blasting the first wall inside the first passageway; and repeating the sealing, filling, recirculating, and using steps.

13. The method of claim 12 wherein:

the metal layer is comprised of a 617-nickel-based superalloy;

the metallic bonding layer is comprised of nickel cobalt chromium aluminum yttrium; and the ceramic layer is comprised of a yttria stabilized zirconia material.

14. The method of claim 13 wherein:

the liquid etchant is comprised of hydrochloric acid and an inhibitor.

15. The method of claim 12 wherein:

masking the holes further comprises:

forming at least one mask over the holes; and the method further comprises:

using the at least one mask to prevent the liquid etchant from entering the second passageway.

16. The method of claim 15 further comprising:

keeping the first passageway in a substantially vertical position while using the liquid etchant to chemically remove the ceramic layer from the first wall such that an input of the first passageway is higher than an output of the first passageway.

17. The method of claim 16 further comprising:

using the liquid etchant to chemically remove the metallic bonding layer from the first wall.

18. The method of claim 12 further comprising:

heating the liquid etchant to a temperature of approximately one hundred thirty to one hundred forty degrees Fahrenheit, wherein:

recirculating the liquid etchant further comprises:

recirculating the liquid etchant at a pressure sufficient to flow the liquid etchant through the first passageway of the transition duct.

19. The method of claim 12 further comprising:

heating the liquid etchant to a temperature of approximately one hundred thirty to one hundred forty degrees Fahrenheit, wherein:

recirculating the liquid etchant further comprises:

recirculating the liquid etchant at a rate sufficient to flow the liquid etchant through the first passageway of the transition duct.

20. A method of refurbishing a transition duct for a gas turbine system, the method comprising:

providing the transition duct comprising:

a first wall defining a first passageway, having holes therein, and comprising a metal layer, a ceramic layer, and a metallic bonding layer located between the metal layer and the ceramic layer, the ceramic layer located between the first passageway and the metallic bonding layer, the first passageway having a length and an input at one end of the length and an output at another end of the length; and a second wall adjacent to and separate from the first wall and external to the first passageway, the first and second walls defining a second passageway coupled to the first passageway through the holes in the first wall;

masking the holes in the first wall;

inserting a distribution bar into the first passageway, the distribution bar extending substantially along the length of the first passageway from the input to the output;

hermetically sealing the first passageway;

pumping a liquid etchant into the first passageway through the input and the distribution bar to fill the first passageway with the liquid etchant while keeping the liquid etchant out of the second passageway;

circulating the liquid etchant out of the first passageway from the output while keeping the liquid etchant out of the second passageway;

recirculating the liquid etchant back into the first passageway via the input and the distribution bar while keeping the liquid etchant out of the second passageway; and using the liquid etchant to chemically strip the ceramic layer from the first wall in preparation for forming a new ceramic layer for the first wall.

21. The method of claim 20 further comprising:

keeping the first passageway in a substantially vertical position while using the liquid etchant to chemically strip the ceramic layer from the first wall such that the input of the first passageway is higher than the output of the first passageway.

22. The method of claim 20 further comprising:

heating the liquid etchant to a temperature of approximately one hundred thirty to one hundred forty degrees Fahrenheit, wherein:

using the liquid etchant further comprises:

using the liquid etchant at approximately one hundred thirty to one hundred forty degrees Fahrenheit to chemically strip the ceramic layer from the first wall.

23. The method of claim 22 wherein:

recirculating the liquid etchant further comprises:

recirculating the liquid etchant at a pressure sufficient to flow the liquid etchant through the first passageway of the transition duct.

24. The method of claim 22 wherein:

recirculating the liquid etchant further comprises:

recirculating the liquid etchant at a rate sufficient to flow the liquid etchant through the first passageway of the transition duct.

25. The method of claim 20 further comprising:
using the liquid etchant to chemically strip all of the ceramic layer from the first wall.

26. The method of claim 25 further comprising:
using the liquid etchant to chemically strip the metallic bonding layer from the first wall in preparation for forming a new ceramic layer for the first wall.

27. The method of claim 26 further comprising:
using the liquid etchant to chemically strip an outer portion of the metal layer into which a portion of the metallic bonding layer is diffused in preparation for forming a new metallic bonding layer for the first wall.

28. The method of claim 20 further comprising:
grit blasting the first wall inside the first passageway to physically remove an oxide layer from the ceramic layer before using the liquid etchant to chemically strip the ceramic layer from the first wall.

29. The method of claim 28 further comprising:
after using the liquid etchant to chemically strip the ceramic layer from the first wall, cleaning the first wall to remove the liquid etchant from the first passageway;
after cleaning the first wall, inspecting the first wall; and
if a portion of the ceramic layer is found while inspecting the first wall:
grit blasting the first wall inside the first passageway to physically remove the oxide layer from the ceramic layer; and
repeating the inserting, hermetically sealing, pumping, circulating, recirculating, and using steps.

30. A method of removing a ceramic layer and a metallic bonding layer from a base material, the method comprising:
providing the metallic bonding layer located between the ceramic layer and the base material; and
chemically removing the ceramic layer and the metallic bonding layer from the base material using a liquid etchant,
wherein:
the ceramic layer comprises yttria-stabilized zirconia containing six to twelve percent yttria;
the metallic bonding layer comprises a material selected from the group consisting of aluminide, platinum-aluminide, and MCrAlY where M is nickel, cobalt or nickel-cobalt;
providing the metallic bonding layer located between the ceramic layer and the base material further comprises:
providing the metallic bonding layer, the ceramic layer, and the base material as portions of a transition duct; and
chemically removing the ceramic layer and the metallic bonding layer further comprises:
using the transition duct as a containment vessel for the liquid etchant used to chemically remove the ceramic layer and the metallic bonding layer.

31. The method of claim 30 further comprising:
masking the transition duct;
sealing the transition duct; and
circulating the liquid etchant through the transition duct, wherein:
the masking, sealing, and circulating steps limit the liquid etchant to contact only portions of the transition duct having the ceramic layer and the metallic bonding layer to be removed.

32. A method of removing a ceramic layer and a metallic bonding layer from a base material, the method comprising:
providing the metallic bonding layer located between the ceramic layer and the base material; and
chemically removing the ceramic layer and the metallic bonding layer from the base material using a liquid etchant,
wherein:
the ceramic layer comprises yttria-stabilized zirconia containing six to twelve percent yttria;
the metallic bonding layer comprises a material selected from the group consisting of aluminide, platinum-aluminide, and MCrAlY where M is nickel cobalt or nickel-cobalt; and
the liquid etchant is heated to a temperature of approximately one hundred twenty to one hundred seventy degrees Fahrenheit before being used to chemically remove the ceramic layer and the metallic bonding layer.

* * * * *